Sept. 26, 1933.  W. H. BISHOP ET AL  1,928,003
BODY FOR MOTOR VEHICLES
Filed March 16, 1931   3 Sheets-Sheet 1
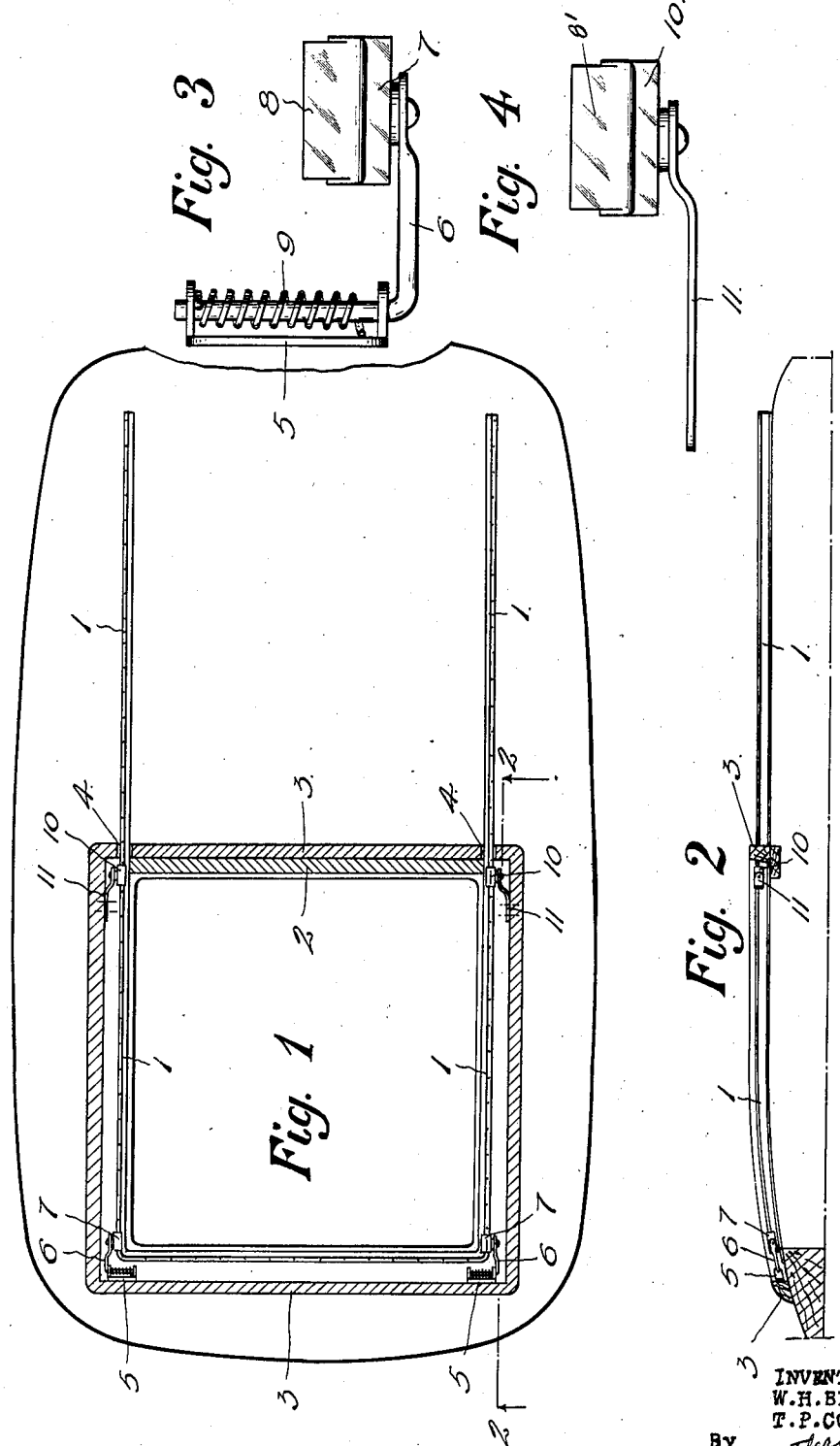
INVENTORS.
W. H. BISHOP.
T. P. COLLEDGE.
By
ATTY.

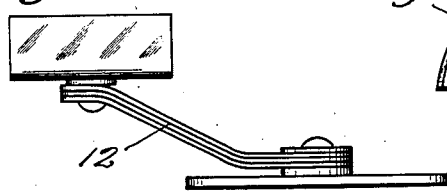
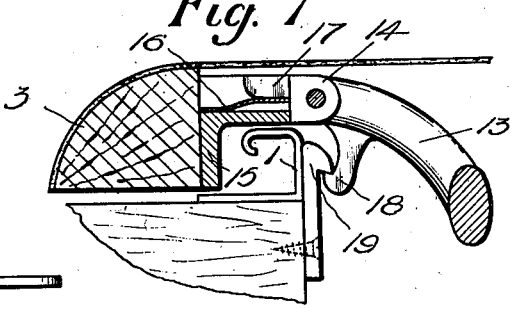
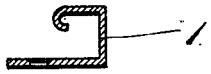
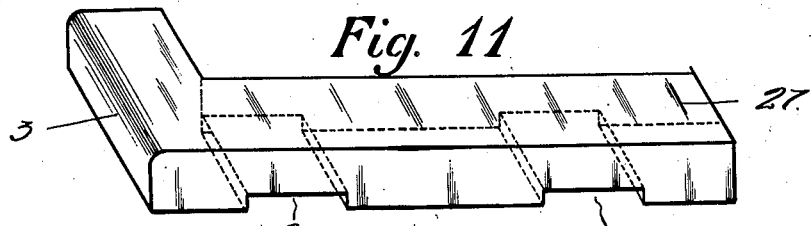
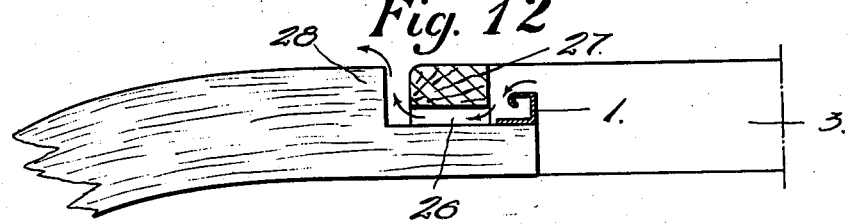
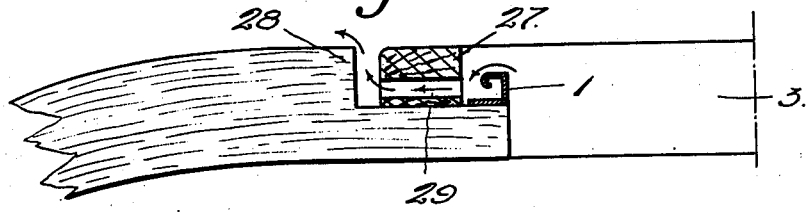

Sept. 26, 1933.    W. H. BISHOP ET AL    1,928,003
BODY FOR MOTOR VEHICLES
Filed March 16, 1931    3 Sheets-Sheet 3
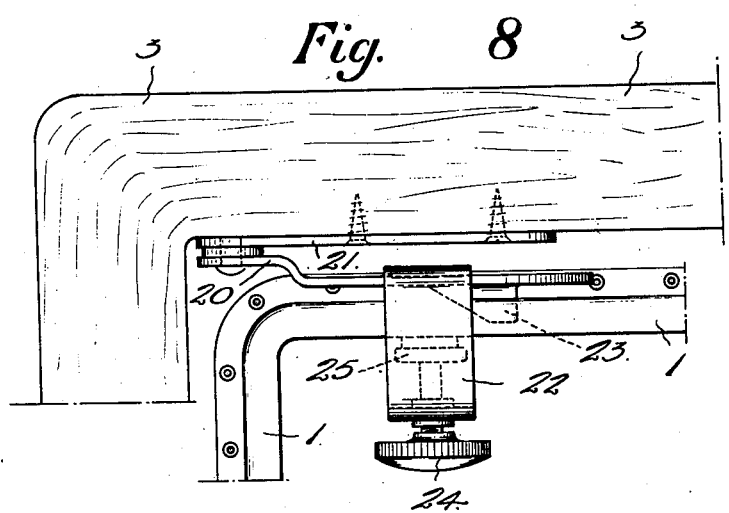
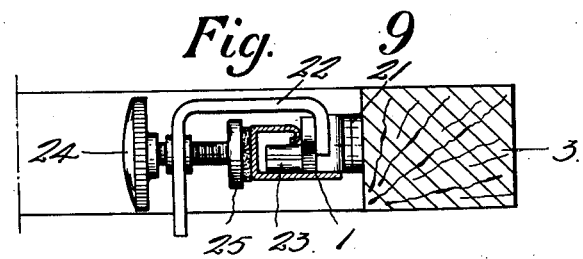
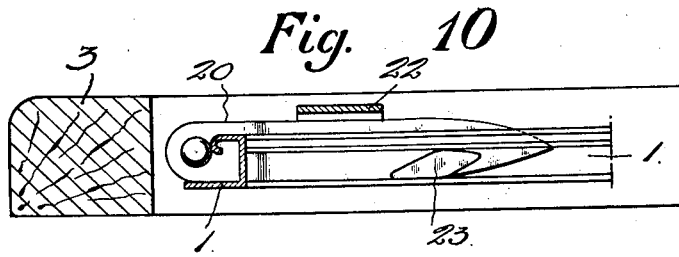
INVENTORS.
W. H. BISHOP.
C. P. COLLEDGE.
By
ATTY.

Patented Sept. 26, 1933

1,928,003

UNITED STATES PATENT OFFICE 1,928,003

BODY FOR MOTOR VEHICLES

William Henry Bishop and Thomas Percy Colledge, Birmingham, England

Application March 16, 1931. Serial No. 522,878

7 Claims. (Cl. 296—137)

This invention relates to improvements in bodies for motor vehicles of the saloon type having a fixed or rigid head.

There is a continually increasing demand for a saloon body which permits the passengers in the vehicle to obtain a view overhead when desired and to have adequate ventilation and fresh air without draughts, and our invention refers particularly to bodies of the type in which an opening is provided in the roof and a cover or panel is longitudinally slidable on or in the roof to close or uncover the opening to any desired extent, watertightness being ensured by an upstanding rim or lip around the opening over which the cover or panel fits when closed.

The object of our invention is to provide an improved roof of this type which is extremely simple and economical to manufacture, consists of a minimum number of individual parts, and can be rapidly and easily fitted to an existing body or to a body in the course of manufacture with a minimum amount of skilled labour.

Another object is to provide a sliding roof which is completely watertight and free from rattle when closed, will remain set in any desired partially open position or in the completely open position without any tendency to movement or rattle, and is extremely simple to operate.

A further object is to provide effective means for ventilating the interior of the body when the cover or panel is closed without risk of any water entering the body and without adding appreciably to the cost of production of the roof.

In a roof according to our invention an upstanding strip of channel section secured upon the roof and extending along each side thereof and around one end and both sides of an opening in the roof serves both as a guide for a sliding cover or panel adapted to close the opening and as a sealing lip or flange over which the cover or panel fits when closed so that no water can enter the body. The strip may be in one single length bent to U outline or may be in two or more lengths and it is of such a section that it has a base for securing to the roof, an upstanding wall, and an outwardly directed flange of which the free edge is curled over downwardly and inwardly to form a re-entrant curved edge which will prevent the passage of water and also to form a smooth edge or flange on which runners carrying the cover or panel can travel.

The front end of the panel is connected by pivoted arms or links to runners travelling on the guide strip so that it can rise to clear the strip across the front of the opening, and the rear end of the panel is pivotally connected to similar runners so that the panel can swing through a small angle about these second runners as the front is raised.

To fit the sliding panel to a roof it is only necessary form the opening, secure the strip upon the roof, and engage the panel with the strip at each side. Fitting is thus extremely simple and resuires a minimum amount of labour, and the whole construction is particularly suitable for rapid production and assembly on mass production lines.

When a vehicle body is completely closed the air within it is liable to be contaminated by exhaust gases from the engine and vision is impaired by condensation of moisture on the screen and windows. To obviate these drawbacks and to give adequate ventilation, slots or apertures may be provided in the side members of the panel so that air from the interior of the vehicle will be drawn out through these openings while the entry of water will be stopped by the strip around the opening.

A practical form of vehicle roof made in accordance with our invention and a number of details of construction are illustrated in the accompanying drawings in which:—

Figure 1 is a plan of the roof showing the panel closed but with its covering removed.

Figure 2 is a longitudinal section on the line 2—2 of Figure 1.

Figure 3 is a plan on an enlarged scale of one of the front fittings for the sliding panel shown in Figures 1 and 2.

Figure 4 is a plan on a similar scale of one of the rear fittings.

Figure 5 is a plan of a modified form of fitting.

Figure 6 is a cross section of the combined sealing flange and guide channel.

Figure 7 is a section of a handle fitting for locking the front end of the panel in the closed position.

Figure 8 is a plan view of an alternative form of front fitting for the sliding panel embodying its own locking means.

Figure 9 is an end elevation of the fitting.

Figure 10 is a side elevation in part section of the fitting showing its action.

Figure 11 is a diagrammatic perspective sketch showing the ventilating grooves in the side members of the panel.

Figure 12 is a section through one side of the panel and the opening showing the ventilating grooves.

Figure 13 is a similar section showing the use of apertures instead of grooves.

In the construction of roof illustrated in Figures 1 and 2 a single channel strip 1 having the special cross section shown in Figure 6 serves as the guide rail for both ends of the panel and as the sealing rim or flange for the front and sides of the opening in the roof. This strip extends as shown in Figure 1 from the rear end of the roof on one side forwardly along one side of the opening in the front of the roof, across the front of the opening, and backwardly along the other side of the opening and to the rear end of the roof again. As shown in Figure 6 the strip has a flat base pierced at intervals to receive nails or screws for securing it to the roof, a vertical wall, and a horizontal upper flange of which the free edge is curled over downwardly and inwardly. The strip for each roof may be in one length or in two or more lengths suitably secured together. For example the portion extending along the sides and across the front of the opening may be made as one length and the rearwardly extending portions on the rear part of the roof may be made as separate lengths to facilitate packing and transport of the fittings. The strip forms an upstanding rim or flange around three sides of the opening in the roof and the rim on the fourth or rear side is formed by a transverse wooden bar 2 having an inclined rear face against which a complementary face on the rear cross member of the panel engages when the panel is closed. The flange of the strip is outwardly directed to form a guide rail and the curved free edge of the flange forms a re-entrant angle which positively prevents water which may be blown under the sliding panel from working round over the strip into the interior of the vehicle.

The sliding panel has a peripheral rigid frame 3 which in the closed position of the panel fits over the strip 1 and the bar 2, the rear cross member of the frame being slotted at 4 for the passage of the strip 1. Secured on the front cross member of the panel at each side is a fitting which is clearly shown in Figure 3. It consists of a pressed metal bracket 5 secured to the cross member and a cranked arm 6 of which one limb is pivoted in the bracket and the other is pivotally connected to a slider 7 in which is secured a grooved block of fibre 8 or like material adapted to engage and slide on the flange of the strip 1. A torsion spring 9 is preferably provided on the arm which tends to hold the front end of the panel down against the roof.

A similar slider 10 is pivotally mounted on a lug 11 secured to each side member of the panel near its rear end as shown in Figures 1 and 2, and carries a similar block 8' engaging and sliding on the flange of the strip 1.

It is not essential that the slider 10 should be pivotally connected to the panel as the angular movement of the panel about the slider is very small and may be allowed for by the resilience of the grip of the slider on the flange of the strip 1.

To open the roof the front end of the panel is simply raised through a small distance to clear the front part of the strip 1 and the panel can then be slid rearwardly to uncover the opening to any desired extent.

In the raising movement the rear edge of the panel pivots on the sliders 10 and the arms 6 swing upwardly about the sliders 7 as pivots. In whatever position the panel is set the springs 9 tend to hold the front end downwardly against the strip 1 and so prevent any tendency to rattle.

In the modified construction shown in Figure 5 the arm 12 which connects the slider to a lug or bracket for securing to the frame of the panel is formed by a laminated steel spring so cranked that it exerts a lateral thrust between the slider and the side of the panel, so that the panel will be frictionally held in any position in which it is set.

Any suitable form of catch may be provided for securing the front end of the sliding panel to the roof when the panel is closed but the combined handle and catch shown in Figure 7 is preferred as it has a number of practical advantages. The handle 13 is pivoted between lugs 14 on a fitting 15 secured to the front cross member of the panel frame. A blade spring 16 secured in a slot in the fitting engages under a forwardly projecting lug 17 on the handle to hold the handle normally depressed and in this position a depending tongue or catch 18 on the handle engages under a latch head 19 secured to the front of the opening in the roof.

To open the panel the handle is simply raised, which will first disengage the tongue from the latch and then, as the lug 17 presses the blade spring against the bottom of the groove, will raise the front end of the panel to clear the strip 1 and permit the panel to be slid backwardly.

In the closing movement the handle is employed to bring the roof forwardly into the closed position, and then as the handle is released the front edge of the panel drops and the tongue snaps under the latch to lock the panel in the closed position. The spring 16 is not essential as the weight of the handle will keep the catch engaged but it is preferred to employ the spring to prevent possible movement or rattle of the handle under vibration on the road.

The alternative form of sliding and pivoting fitting for the front end of the panel illustrated in Figures 8, 9 and 10 consists of an arm 20 pivoted on a lug or plate 21 which is secured to the side member of the panel frame adjacent to its front end. The arm carries, or has formed integrally with it, a bracket 22 of inverted U-form which fits over the strip 1. One flange of the bracket carries a tongue 23 of substantially diamond cross-section fitting into the channel between the flange and base of the strip 1, and the other flange carries a screwed clamping device which works through a boss on the flange and has on one end a milled operating head 24 and on the other end a pad 25 faced with rubber or like material and adapted to engage against the inner face of the strip 1 to clamp the panel in position. To open the panel the clamping device is released and the front end of the panel is raised to clear the strip 1 as the panel is slid rearwardly. This rising movement of the panel is permitted by the diamond form of the tongue 23 which can rock within the channel of the strip 1 and yet will be a substantially accurate sliding fit in the channel whether the front end of the panel is raised or lowered.

For ventilation purposes grooves or slots 26 may be cut in the under surface of the side members 27 of the panel frame as shown in Figure 11. Thus when the panel is in the closed position air can circulate freely through these openings between the interior of the vehicle and the outer atmosphere, and normally when the vehicle is travelling air passing the outer ends of the openings at right angles to the openings will extract air from the interior of the vehicle. At the same time any water which might enter through the openings will be trapped by the strip 1 and drained away in the ordinary way so that no water can enter the vehicle.

When the panel is fitted in a longitudinal recess in the roof as shown in Figure 12, the raised side 28 of the roof will conceal the openings from view but this raised side of the roof will be spaced sufficiently far from the side edges of the panel to allow free circulation of the air.

Instead of forming grooves in the under surface of the side members of the panel apertures 29 may be pierced through the side members as shown in Figure 13.

We claim:

1. A saloon body for motor vehicles having a rigid roof, said roof having an opening therein, an upstanding guide strip of U outline in plan secured upon the roof and extending along each side thereof and around one end and both sides of said opening, a transverse strip secured upon the roof across the other end of said opening, a cover fitting over said opening and over the transverse strip and the portions of the guide strip around the opening, and slidable and pivotal connections between the cover and the guide strips to permit the cover to slide longitudinally on the roof to close or uncover the opening to any desired extent.

2. A saloon body for a motor vehicle having a rigid roof, said roof having an opening in the front part thereof, a rail secured upon the roof and extending across the front and along the sides of the opening and extending backwardly on each side towards the rear end of the roof, a transverse strip extending across the roof between the side portions of the rail at the rear end of the opening, a cover fitting over the opening and over the transverse strip and the portions of the rail around the front and sides of the opening to form a water-tight closure for the opening, rising and sliding connections between the cover and the rail adjacent to the front end of the cover and pivoting and sliding connections between the cover and the rail adjacent to the rear end of the cover.

3. A saloon body for motor vehicles having a rigid roof, said roof having an opening therein, an upstanding guide strip secured upon said roof and extending along each side thereof and around the front and both sides of the opening, a cover adapted to fit over said opening and over the portions of the guide strip around it, and sliding and pivoting connections between the cover and the guide strip at each side, said connections being resilient to apply lateral thrust between the cover and guide strip and so to retain the cover in any longitudinal position in which it is set.

4. A saloon body for motor vehicles having a rigid roof, said roof having an opening therein, an upstanding guide strip of U outline in plan secured upon the roof and extending along each side thereof and around one end and both sides of said opening, said strip having a flat base for securing to the roof a vertical side and an outwardly directed horizontal flange with a downwardly and inwardly curved free edge to form a guide rail and water trap, a transverse strip secured upon the roof across the other end of said opening, a cover fitting over said opening and over the transverse strip and the portions of the guide strip around the opening, and slidable and pivotal connections between the cover and the guide strips to permit the cover to slide longitudinally on the roof to close or uncover the opening to any desired extent.

5. A saloon body for motor vehicles having a rigid roof, said roof having an opening therein, an upstanding guide strip of U outline in plan secured upon the roof and extending along each side thereof and around one end and both sides of said opening, a transverse strip secured upon the roof across the other end of said opening, a cover fitting over said opening and over the transverse strip and the portions of the guide strip around the opening, links pivoted to the cover adjacent to the front thereof and pivotally connected to sliders travelling on the guide strip to permit the front of the cover to rise and slide longitudinally, and connections between the cover adjacent to its rear end and further sliders travelling on the guide strip.

6. A saloon body for motor vehicles having a rigid roof, said roof having an opening therein, an upstanding guide strip of U outline in plan secured upon the roof and extending along each side thereof and around one end and both sides of said opening, a transverse strip secured upon the roof across the other end of said opening, a cover fitting over said opening and over the transverse strip and the portions of the guide strip around the opening, slidable and pivotal connections between the cover and the guide strips to permit the cover to slide longitudinally on the roof to close or uncover the opening to any desired extent, and passages in the sides of said cover for the circulation of air between the interior of the vehicle and the outer atmosphere when the opening is closed by the cover.

7. A saloon body for motor vehicles having a rigid roof, said roof having an opening therein, an upstanding guide strip of U outline in plan secured upon the roof and extending along each side thereof and around one end and both sides of said opening, a transverse strip secured upon the roof across the other end of said opening, a cover fitting over said opening and over the transverse strip and the portions of the guide strip around the opening, slidable and pivotal connections between the cover and the guide strips to permit the cover to slide longitudinally on the roof to close or uncover the opening to any desired extent, a handle pivotally mounted on the cover at its forward end, and a catch member at the front end of the opening with which said handle automatically engages when the cover is closed and from which the cover is automatically disengaged when the handle is raised to open the cover.

WILLIAM HENRY BISHOP.
THOMAS PERCY COLLEDGE.